April 23, 1968 P. W. KOETSCH 3,379,955
APPARATUS FOR PROTECTING THE SWITCHING ELEMENTS
OF STATIC INVERTERS FROM TRANSIENT VOLTAGES
Filed Nov. 17, 1964 2 Sheets-Sheet 1

INVENTOR.
PHILIP W. KOETSCH
BY
George C. Sullivan
Agent

United States Patent Office 3,379,955
Patented Apr. 23, 1968

3,379,955
APPARATUS FOR PROTECTING THE SWITCHING ELEMENTS OF STATIC INVERTERS FROM TRANSIENT VOLTAGES
Philip W. Koetsch, Marietta, Ga., assignor to Lockheed Aircraft Corporation, Burbank, Calif.
Filed Nov. 17, 1964, Ser. No. 411,806
6 Claims. (Cl. 321—45)

ABSTRACT OF THE DISCLOSURE

A static inverter of the type using controlled rectifier switching elements subject to damage by the application of an excessive voltage to the switching elements while in a non-conductive state. The input side of the switching bridge is shunted by a series circuit including a capacitance and a diode. During steady-state operation of the inverter the capacitance becomes charged approximately to the input voltage. The occurrence across the bridge input of a transient voltage in excess of the normal voltage across the capacitance causes the diode to conduct so that the transient voltage is shunted by the series circuit. After steady-state conditions return, the charge added to the capacitance is removed either by dissipation in a resistance or by being selectively gated into the bridge input circuit.

---

This invention relates in general to power supplies and in particular to power supplies of the static inverter type wherein a direct current is converted to an alternating current.

Many basic types of devices and circuits are known for converting direct current to alternating current. Some such devices, such as the motor-generator and dynamotor, suffer the disadvantages of excessive weight and physical size. The vibrator type of inverter has less than optimum reliability due to relatively poor frequency stability and the likelihood of vibrator failure.

For many applications a static inverter having no moving components is preferred. Basically, the static inverter comprises one or more switching elements which are operated so as to cause the direct current from the source to flow through the inverter output in an alternating direction. The switching elements typically are solid-state devices such as silicon controlled rectifiers (SCR's) although any suitable control switching device, such as a thyratron tube, may also be used for this purpose. One such static inverter has four switching elements arranged in a bridge with direct current supplied to one diagonal of the bridge and the alternating current output being taken across the other diagonal of the bridge. The switching elements are switched between their conductive states and non-conductive states by appropriate control circuitry.

A problem encountered with a static inverter of this type is that of the voltage which must be switched by each of the switching means. Particularly at no-load conditions of the inverter, a particular switching element may be subjected to transient voltage several times the value of the nominal D.C. input voltage at or shortly after the time this switching element is rendered non-conductive. Since an excessive forward voltage applied to a switching element can cause breakdown of the element to occur, switching elements must be chosen which have a forward voltage rating many times in excess of the nominal or supply voltage actually switched. Since the cost of switching elements generally is a direct function of, among other things, the forward voltage rating of the switching element, the cost of this type of static inverter is increased by the need to protect the switching elements against undesirable transient voltage pulses.

In static inverters employing an inductance in the D.C. input line, a diode is frequently inserted across the inductance in an attempt to dissipate some of the energy that causes the undesired transient voltages. During the switching or commutating period of the static inverter, however, the partial or total collapse of the inductance field along with resonant charging of the commutating capacitance produces a relatively large amount of energy which must be dissipated in any by-pass diode connected across the inductance, so that a diode having a relatively high current carrying capacity and a commensurately high cost must be chosen.

It has been discovered that the need for such a by-pass diode can be eliminated and the transient voltage seen by the switching elements limited to little more than the D.C. voltage to be switched if a capacitance made substantially larger than the commutating capacitance is connected across the input diagonal of the bridge. This capacitance will be charged to approximately the input D.C. voltage during steady-state operation of the inverter. A diode connected in series with the capacitance prevents discharge of the capacitance due to negative voltage transients at the beginning of the commutation period. As a positive voltage appears, most of the current caused by this voltage will pass through the capacitance whereby the voltage impressed across the non-conductive switching elements will be limited. In one embodiment of the invention, the energy received by this capacitance will be dissipated in a suitable resistance while in another embodiment of the invention an auxiliary switching element permits this energy to be fed back into the inverter at an appropriate time.

Accordingly, it is an object of this invention to provide an improved static inverter.

Another object of this invention is to provide a static inverter wherein the voltage blocking requirements of the switching components are reduced for a given output voltage of the inverter.

A further object of this invention is to provide a static inverter in which the need for a line inductance by-pass diode is eliminated.

Still another object of this invention is to provide a static inverter in which the energy stored in the line inductance does not impose an excessive voltage on the switching elements during the commutation period.

Yet another object of this invention is to provide a static inverter that has improved efficiency.

A still further object of this invention is to provide a static inverter that utilizes less expensive components.

The exact nature of this invention as well as other objects and advantages thereof will be readily apparent from consideration of the following specification relating to the annexed drawings in which.

Stated generally this invention comprises a capacitance connected in parallel across the input of a static inverter switching element bridge. During steady-state operation of the inverter, this capacitor will charge to a level approximating the D.C. supply voltage. At the beginning of the inverter commutation period a transient reverse voltage appears across the bridge input and this capacitance, but a diode connected in series with the capacitance prevents the capacitance from discharging at that time. When the transient voltage, seen by the switching element bridge, swings positively and exceeds the value to which the capacitance has been charged, the diode in series therewith becomes conductive to permit further charging of the capacitance by the transient voltage in excess of the supply voltage so that the transient voltage, as seen by the switching element bridge, will be minimized. In one embodiment of this invention, the charge thus delivered to the capacitance will be dissipated through a resistance connected in series with the capacitance. In another embodiment of this invention, an auxiliary controlled switching element connected across the blocking diode will be gated to its conductive state at the proper time to permit the charge received by the capacitance to be delivered back into the inverter.

Figure 1:
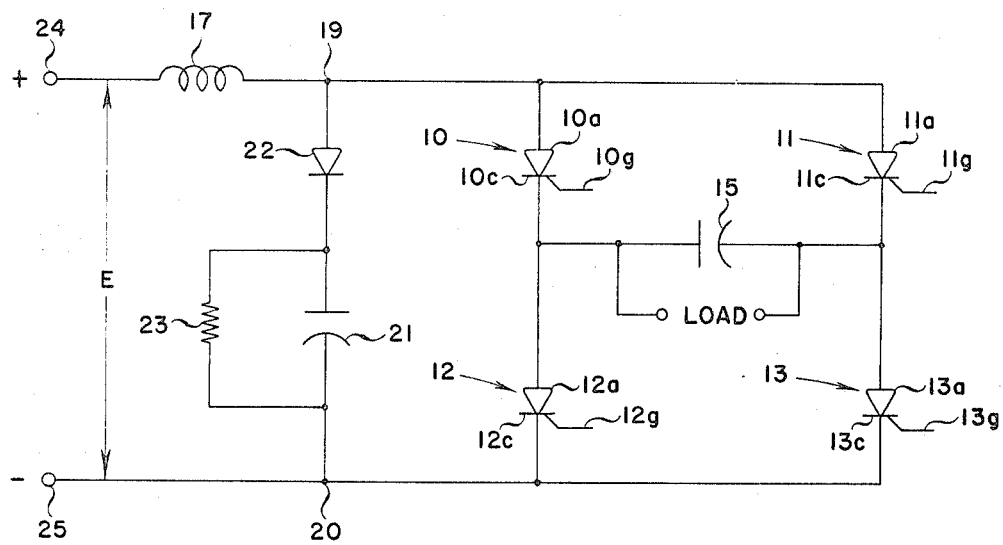
FIGURE 1 shows a schematic of an embodiment of this invention.

Turning now to the particulars of an embodiment of the invention, there is shown in FIGURE 1 a static inverter including switching elements 10, 11, 12 and 13. These switching elements are arranged in a manner well known to those skilled in the art, with anodes 10a and 11a receiving the positive side of a source of D.C. potential and cathodes 12c and 13c receiving the negative side of the source of D.C. potential. Cathode 10c is connected to anode 12a and cathode 11c is connected to anode 13a. Connected between these cathode-anode junctions is a commutating capacitance 15 in parallel with the inverter output load terminals, and inductance 17 is contained in the line connecting the anode side of the switching element bridge to the positive source of D.C. input potential.

The basic circuit as described above comprises a static inverter for converting D.C. into A.C. The switching elements 10, 11, 12 and 13 in this embodiment are chosen to be silicon controlled rectifiers (SCR's) which have the well-known characteristic of being either in a non-conductive state or in a conductive state. Each of the SCR's may be bated to its conductive state through the application of a suitable control current to the respective gating electrodes 10g, 11g, 12g and 12g. Of course, any other suitable switching device, such as a thyratron tube, could be in lieu of the SCR's.

This basic inverter works as follows. At a given moment one pair of switching elements, for example elements 10 and 13, will be rendered conductive while the other pair of elements, for example 11 and 12, will be retained in their non-conductive state. This will apply a potential of a certain polarity to commutating capacitance 15 and the output load terminals. At the end of a predetermined interval of time equal to one-half the period of the alternating current being produced, the order of conduction of the switching elements will be reversed with elements 10 and 13 being rendered non-conductive and elements 11 and 12 being rendered conductive, whereby a potential of the opposite polarity will be applied to capacitance 15 and the output load terminals. A suitable load connected to the output terminals will receive alternating current therefrom. The control currents for the switching elements 10–13 are supplied by pulse generating apparatus well known to those skilled in the art.

Figure 3:
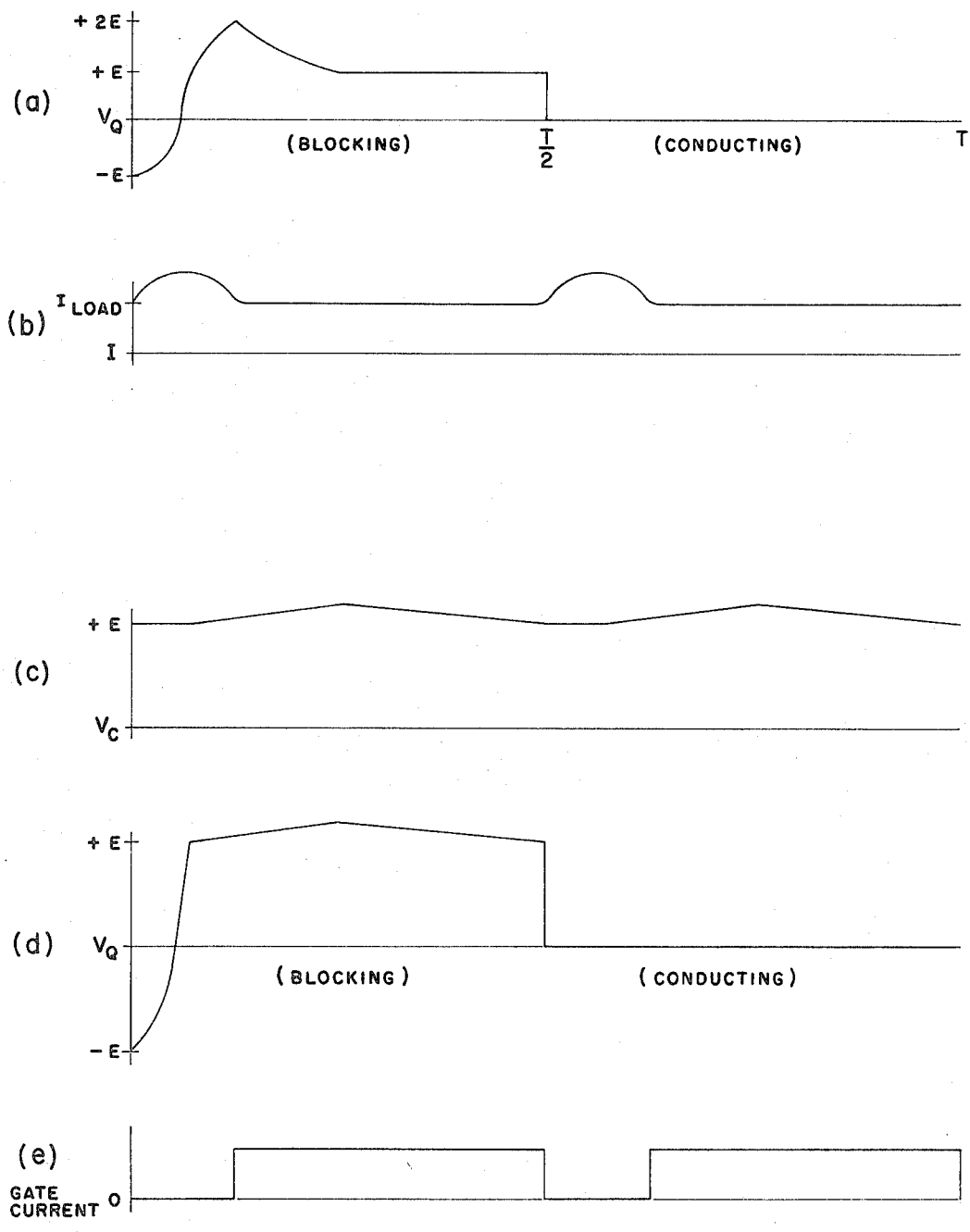
FIGURE 3 shows a number of waveforms representing various voltages and currents occurring in the embodiment of FIGURE 2.

As each switching element is switched from the conductive state to the non-conductive state, this element is subjected to a transient voltage pulse substantially in excess of the steady-state forward blocking voltage which this switching element is required to withstand. The voltage $V_Q$ across a typical one of the switching elements is shown in FIGURE 3 as wavefrom (a). At the moment of switching a voltage of minus E volts will be applied across this element (assuming the D.C. input voltage to the inverter to be E volts) since capacitance 15 will have been charged to approximately E volts in the last preceding half-cycle of inverter operation. At the same time, inductance 17 sees a 2E voltage and begins draw current in addition to the normal load current. The current I through the inductance is represented by waveform (b) of FIGURE 3.

The additional current drawn by the inductance has the effect, by way of example, of changing the charge across capacitance 15 from minus E volts to plus 2E volts, and this voltage will be impressed on the non-conductive switching elements. This transient voltage peak will slowly diminish to a steady-state voltage of E as the effect of the inductance is dissipated and capacitance 15 again becomes charged to approximately the D.C. input voltage. This transient peak voltage will occur every half-cycle of inverter operation and will be applied across those switching elements that are non-conductive during a particular half-cycle.

These undesirable transient voltages can be substantially reduced according to the present inveintion by the insertion across points 19 and 20 of the inverter circuit of a capacitance 21 in series with a diode 22. The circuit of this embodiment is completed with the addition of a resistance 23 connected across capacitance 21.

The invention according to this embodiment functions in the following manner. During the steady-state operation of the inverter, the voltage $V_C$ across capacitance 21 becomes approximately E volts, as shown by waveform (c) in FIGURE 3, through capacitance charging. At the moment of inverter bridge switching the charge on capacitance 15, as explained above, causes a minus E voltage to be seen at thte input terminals of the switching element bridge. This negative voltage biases diode 22 to a non-conductive state so that the charge stored on capacitance 21 is not effected. As the positive going transient voltage exceeds E volts, the anode of diode 22 will again become positive with respect to the cathode thereof so that diode 22 will permit conduction from point 19 to point 20. If the value of capacitance 21 is made sufficiently greater than that of capacitance 15 most of the current in excess of the load current, induced by inductance 17, will be divereted from the switching element bridge by capacitance 21. The voltage $V'_Q$ across one of the non-conductive switching elements, as seen in waveform (d) of FIGURE 3, has a transient voltage component exceeding by only a relatively small amount the steady-state voltage E which these switching elements are required to switch. It should be noted that during the period when the transient voltage pulse would normally exceed E volts capacitance 21 is effectively in series with capacitance 15.

The energy received during the transient interval by capacitance 21 must be dissipated in resistance 23 during the remainder of that half-cycle of inverter operation so that capacitance 21 will be charged to no more than approximately E volts by the time of the next switching transient. For this reason, the frequency of operation of the embodiment of FIGURE 1 is limited in upper operating frequency if the voltage overshoot is to be kept to a relatively low value.

Figure 2:
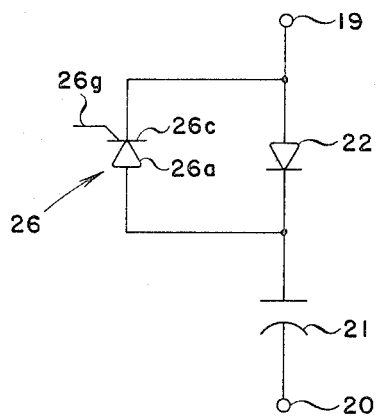
FIGURE 2 shows a schematic of another embodiment of this invention.

The frequency limitation of the FIGURE 1 embodiment is greatly reduced in the embodiment of the invention set forth in FIGURE 2. In FIGURE 2 there are shown only those elements received between circuit points 19 and 20, and it will be seen that resistance 23 has been omitted and that a controlled switching element 26 has been connected across diode 22. Switching element 26, which by way of example may be an SCR, has an anode 26a connected to the junction of diode 22 and capacitance 21 and a cathode 26c connected to terminal point 19 with the other side of diode 22. Gate 26g is connected to receive appropriate current pulses whereby switching element 26 may be selectively gated into a conducting state.

The operation of the embodiment of FIGURE 2 is quite similar to that set forth above for the FIGURE 1 embodiment, the significant difference being in the manner in which the charge in excess of E volts, received by capacitance 21 during the transient interval is dissipated. Whereas in the embodiment of FIGURE 1 this energy is resistively dissipated and is therefore wasted insofar as inverter efficiency is concerned, the embodiment of FIG- URE 2 causes this energy to be returned to the inverter by gating switching element 26 into the conductive state at an appropriate time after the inverter switching process has ended for a given half-cycle. As shown in waveform (e) of FIGURE 3, the gating current is first applied for example at the time when $V_Q$ would have reached its maximum transient voltage and I would have returned to its steady-state value in the absence of applicant's invention. The time at which control switching element 26 is gated to conduction is not critical, however, so long as switching element 26 ceases to conduct before the end of the half-cycle. Of course, switching element 26 must be non-conductive during switching of the inverter bridge and until the transient current drawn from the D.C. source reaches its maximum value. Since the extra energy received by capacitance 21 during the transient switching interval is returned to the circuit and not resistively dissipated, it will be seen that the embodiment of FIGURE 2 has the added advantages of being more efficient and of having a higher upper operating frequency limit.

From the foregoing it will be seen that there has been disclosed and described circuitry which limits the transient voltage applied to the switching elements in a bridge type of inverter to a value only slightly in excess of the D.C. supply voltage to the inverter. Because of this, the forward voltage which the switching elements must withstand can be reduced commensurately, whereby the cost of switching elements for a given inverter rating can also be reduced.

It should be understood of course that the foregoing disclosure relates to only preferred embodiments of the invention and that numerous modifications or alterations may be made therein without departing from the spirit and the scope of the invention as set forth in the appended claims.

What is claimed is:

1. A static inverter comprising:
    a bridge circuit including a plurality of controlled switching elements and having an input to which direct current is applied and an output at which alternating current is present;
    a diode means having an anode and a cathode, said anode being connected to that side of the input of said bridge circuit receiving positive polarity direct current;
    a capacitance connected between the cathode of said diode means and the side of the input of said bridge circuit receiving negative polarity direct current; and
    a resistance connected across said capacitance to permit the charge on said capacitance to be reduced to a desired value.

2. A static inverter comprising:
    a bridge circuit having a plurality of switching elements and having an input to which direct current is applied and an output at which alternating current is present;
    a capacitance connected across said output;
    inductance means connected to one side of said bridge circuit input, said inductance means being supplied from a source of direct current;
    a diode having one electrode thereof connected to said one side of said bridge circuit;
    a second capacitance larger than the first mentioned capacitance and connected between another electrode of said diode and the other side of said bridge circuit input; and
    means connected to said second capacitance to permit the charge on said second capacitance to be reduced to a desired value.

3. In a static inverter of the type including a bridge circuit with a plurality of switching elements and having an input to which direct current is applied and an output at which alternating current is present, a capacitance connected across said output, inductance means connected to one side of said bridge circuit input, said inductance means being supplied from a source of direct current, the improvement comprising:
    a diode having an electrode thereof connected to said one side of said bridge circuit;
    a second capacitance larger than the first mentioned capacitance and connected between another electrode of said diode and the other side of said bridge circuit input; and
    means connected to said second capacitance to permit the charge thereon to be reduced to a desired value.

4. The invention as in claim 3 wherein said last-named means comprises a resistance connected across said second capacitance.

5. The invention as in claim 3 wherein said last-named means comprises a controlled switching means connected to selectively by-pass said diode.

6. A static inverter comprising:
    a bridge circuit including a plurality of controlled switching elements and having an input to which direct current is applied and an output at which alternating current is present;
    diode means having an anode and a cathode, said anode being connected to the side of the input of said bridge circuit receiving positive polarity direct current;
    a capacitance connected between the cathode of said diode means and the negative polarity side of the input of said bridge circuit; and
    a controlled switching means connected across said diode means with a polarity to permit current to flow from the cathode side of said diode means to the anode side thereof when said controlled switching means is in a conductive state.

References Cited

UNITED STATES PATENTS

| | | | |
|---|---|---|---|
| 3,321,697 | 5/1967 | Etter | 321—45 |
| 3,131,343 | 4/1964 | Reinert | 321—45 X |
| 3,213,287 | 10/1965 | King | 321—45 X |
| 3,222,587 | 12/1965 | Lichowsky | 321—45 X |
| 3,259,827 | 7/1966 | Strohmeier et al. | 321—45 X |
| 3,262,036 | 7/1966 | Clarke et al. | 318—230 |
| 3,278,827 | 10/1966 | Corey et al. | 321—44 |

JOHN F. COUCH, *Primary Examiner.*

WARREN E. RAY, *Examiner.*

W. M. SHOOP, *Assistant Examiner.*